(12) United States Patent
Zecca

(10) Patent No.: US 9,119,476 B2
(45) Date of Patent: Sep. 1, 2015

(54) SYSTEM FOR RECEIVING A USER

(75) Inventor: Gabriele Zecca, Parma (IT)

(73) Assignee: SYNERGY BUSINESS & FINANZA SOCIETA' A RESPONSABILITA' LIMITATA, Parma (IT)

( * ) Notice: Subject to any disclaimer, the term of this patent is extended or adjusted under 35 U.S.C. 154(b) by 445 days.

(21) Appl. No.: 13/511,567

(22) PCT Filed: Dec. 1, 2010

(86) PCT No.: PCT/IB2010/055520
§ 371 (c)(1),
(2), (4) Date: May 23, 2012

(87) PCT Pub. No.: WO2011/067720
PCT Pub. Date: Jun. 9, 2011

(65) Prior Publication Data
US 2012/0279090 A1 Nov. 8, 2012

(30) Foreign Application Priority Data
Dec. 1, 2009 (IT) .............................. MO2009A0283

(51) Int. Cl.
*B32B 3/24* (2006.01)
*A47C 27/00* (2006.01)
*A43B 1/00* (2006.01)
*A43B 7/08* (2006.01)
(Continued)

(52) U.S. Cl.
CPC ................. *A47C 27/007* (2013.01); *A43B 1/00* (2013.01); *A43B 7/088* (2013.01); *A43B 13/42* (2013.01); *A43B 17/102* (2013.01); *A47C 7/18* (2013.01); *A47C 7/40* (2013.01); *A47C 21/046* (2013.01); *A47C 27/122* (2013.01); *B62B 9/108* (2013.01); *B32B 3/266* (2013.01); *Y10T 428/24331* (2015.01)

(58) Field of Classification Search
CPC ........ A43B 13/42; A43B 7/088; B32B 3/266; Y10T 428/24331
USPC ........................................................ 428/138
See application file for complete search history.

(56) References Cited

U.S. PATENT DOCUMENTS

| 4,530,873 A | 7/1985 | Okada |
| 4,695,496 A | 9/1987 | Lee |

(Continued)

FOREIGN PATENT DOCUMENTS

| CN | 2293481 Y | 10/1998 |
| CN | 2912384 Y | 6/2007 |

(Continued)

*Primary Examiner* — William P Watkins, III
(74) *Attorney, Agent, or Firm* — Volpe and Koenig, P.C.

(57) ABSTRACT

A system for removing moisture from a user's skin includes a casing having a first portion made of a material including hydrophilic and hydrophobic fibers configured to convey a liquid and/or vapor from outside to inside. The first portion configured to contact, or be near, a user's body part. The casing includes a second portion not configured to contact the body part, and at a third portion joining the first and second portions. The second and/or third portions are made of material configured to convey a liquid and/or vapor from inside to outside the casing. Padding, enclosed between the first and second portions, has a porous structure enabling the inside to be ventilated by vapor exiting the casing by contraction of a volume of the padding causing air to enter the casing by expansion in the volume of the padding. The porous structure has a resiliently compressible variable volume.

2 Claims, 6 Drawing Sheets

(51) Int. Cl.
*A43B 13/42* (2006.01)
*A43B 17/10* (2006.01)
*A47C 7/18* (2006.01)
*A47C 7/40* (2006.01)
*A47C 21/04* (2006.01)
*A47C 27/12* (2006.01)
*B62B 9/10* (2006.01)
*B32B 3/26* (2006.01)

(56) References Cited

U.S. PATENT DOCUMENTS

| | | |
|---|---|---|
| 4,775,575 A | 10/1988 | Tang |
| 5,488,746 A | 2/1996 | Hudson |
| 5,522,810 A * | 6/1996 | Allen et al. .................. 604/366 |
| 5,735,145 A | 4/1998 | Pernick |
| 6,389,711 B1* | 5/2002 | Polegato ........................ 36/3 R |
| 6,548,731 B2* | 4/2003 | Mizutani et al. .............. 604/365 |
| 7,311,685 B1 | 12/2007 | Policastro, Jr. |
| 2003/0124928 A1 | 7/2003 | Sherrod et al. |
| 2005/0142334 A1 | 6/2005 | Mikata et al. |
| 2005/0229317 A1 | 10/2005 | Heiser et al. |
| 2008/0121674 A1 | 5/2008 | Yang |
| 2008/0127519 A1* | 6/2008 | Byrne et al. .................... 36/102 |
| 2008/0178496 A1* | 7/2008 | Lin et al. ........................ 36/30 R |
| 2008/0307679 A1* | 12/2008 | Chiang et al. .................. 36/3 B |

FOREIGN PATENT DOCUMENTS

| | | |
|---|---|---|
| CN | 201169219 Y | 12/2008 |
| CN | 201224208 Y | 4/2009 |
| CN | 20123885 Y | 5/2009 |
| EP | 0639361 A1 | 2/1995 |
| EP | 0792594 A1 | 9/1997 |
| EP | 1192886 A1 | 3/2002 |
| EP | 1454560 A1 | 9/2004 |
| EP | 1530934 A1 | 5/2005 |
| EP | 1266584 B1 | 12/2005 |
| EP | 1967626 A1 | 10/2008 |
| FR | 2700252 A1 | 8/1993 |
| GB | 2138745 A | 10/1984 |
| GB | 2248774 A | 4/1992 |
| GB | 2439532 A | 2/2008 |
| JP | 8302506 A | 11/1996 |
| JP | 9135716 A | 5/1997 |
| JP | 2000210102 A | 8/2000 |
| JP | 2006122417 A | 5/2006 |
| WO | 9401609 A1 | 1/1994 |
| WO | 9851177 A2 | 11/1998 |
| WO | 0123125 A2 | 4/2001 |
| WO | 2006013317 A2 | 2/2006 |
| WO | 2006076722 A2 | 7/2006 |
| WO | 2007034204 A1 | 3/2007 |
| WO | 2007107264 A1 | 9/2007 |
| WO | 2008118070 A1 | 10/2008 |

* cited by examiner

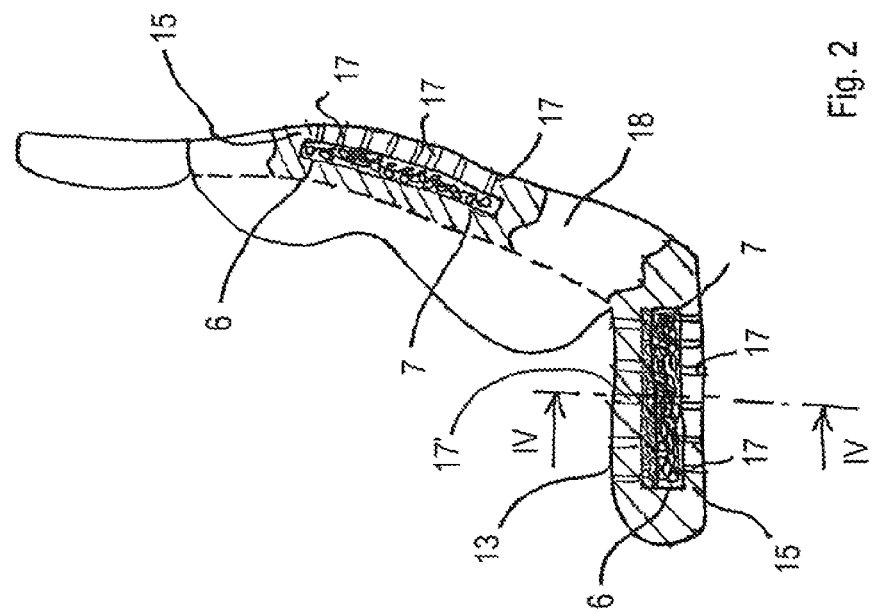
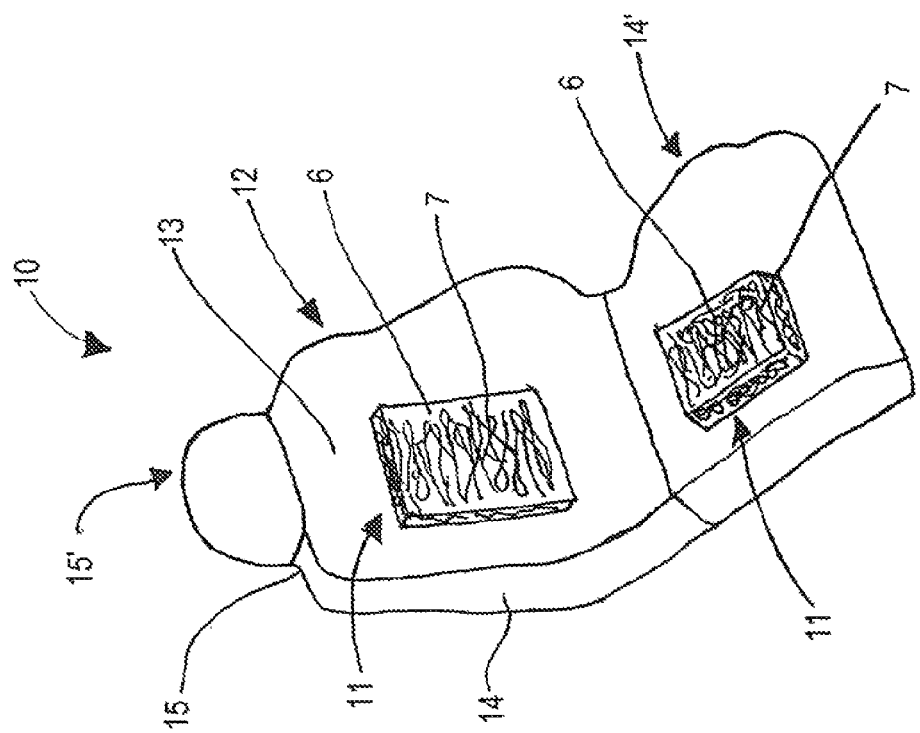

SYSTEM FOR RECEIVING A USER

BACKGROUND OF THE INVENTION

The invention relates to a system for receiving a user, that is in particular usable for being placed above, or integrated into mattresses, armchairs or sofas for furnishings or for motor vehicles, cushions, padded seats or backs, rucksacks, sporting equipment, pushchairs for children, seats for children (for example car seats or high chairs), motor-cycle seats, or to be integrated inside a shoe. In particular, the system in object is used to receive in a contact relationship a part of the body of an individual, such as, for example, the back or the sole, keeping the skin dry and removing therefrom the sweat and the humidity.

The prior art comprises breathable fabrics which, in use, in contact with the skin of a user, are able to maintain the skin dry.

For example, from international patent application WO 2006/013317 a breathable fabric for clothing is known comprising a layer of textile fibres that are permeable to water vapour and impermeable to liquids, in which absorbing means is positioned on at least one part of a side of the layer of fibres.

International patent application WO 2007/034204 shows a fabric with a side formed by hydrophobic fibres, for example, made of polyester or polypropylene, and the opposite side formed by a mixture of hydrophobic fibres and hydrophilic fibres, for example in cellulose fibres such as cotton or viscous rayon.

U.S. Pat. No. 5,735,145 shows a fabric comprising a first hydrophobic layer and a second hydrophilic layer that are fixed together and maintained spaced apart from one another by a series of yarns.

There are further known, for example from patent documents FR 2 700 252, CN 2912384, US 2008/0121674, WO 99/10198 and CN 2293481, mattresses, cushions or seats provided with channels that laterally convey the sweat and the humidity sucked by an external layer in contact with the skin of a user.

The prior art also comprises various materials and/or multilayered structures that are associable with clothing or objects with which the skin of a user comes into contact. These multilayered elements comprise a plurality of layers made of fabric, polymers or polymer foams. The layers can be permeable or impermeable to humidity and sweat. In particular it is known making at least one permeable layer, at least one impermeable layer and at least one layer (in general, polymeric) that absorbs and collects the humidity and/or the sweat, which are then conveyed outwards, where they are expelled, for example by evaporation. These multilayered elements have the object of drying, and thus making more comfortable, the surface in direct contact with the skin of the user owing to the elimination and removal of humidity and/or sweat generated by the skin.

These multilayered elements are shown, for example, by the United Kingdom patent publication GB 2 439 532, which discloses a sheet material for absorbing water, comprising a first layer of microbrushed polyester and a second layer of a fabric that absorbs water (felt). The sheet may further comprise a third permeable layer, for example of polyester and cotton.

U.S. Pat. No. 4,775,575 shows a layered fabric in which the humidity of the body is absorbed by a lower layer and is then transferred through an intermediate layer having fibres that are able to absorb humidity through capillary action, to an upper layer, having both humidity-absorbing fibres and humidity-repellent fibres, where it evaporates. U.S. Pat. No. 4,695,496 shows a multilayered protection coating for the skin that comprises four layers: a first layer in contact with the skin is made of a plurality of elongated hydrophobic fibres (for example polyester fibres) that remove humidity and sweat from the body, a membrane layer of perforated hydrophobic material (for example GORE-TEX®), a layer of porous foam that stores the drops of water that condense here, and an external covering layer in vinyl.

International patent application WO 2008/118070 discloses a wetsuit comprising an external impermeable layer (for example made of polyurethane) and an internal insulating layer. A three-dimensional polyester fabric that is flexible and can be traversed by the air in two directions is removably attached to the inside of the external layer.

The publication of European patent EP 1 967 626 discloses a sheet for absorbing sweat comprising two opposite surface layers made of a mixture of hydrophobic and hydrophilic fibres made of synthetic thermoplastic resin, and an internal layer of hydrophilic fibres interposed between the two surface layers.

International patent application WO 01/23125 discloses a laminar structure that is impermeable to liquid but permeable to wet vapour comprising an external layer, an opening through which air passes, and an insulating system that comprises a first layer, an insulating layer and a steam-control layer.

In international patent application WO 2006/076722 a composite, breathable and hydrorepellent sheet, comprises a thermoplastic film, that is not porous and permeable to wet vapour, coated on opposite sides with an absorbent layer and a repellent layer.

Multilayered fabrics are also known for example from patent documents WO 2007/107264, EP 1 266 584, U.S. Pat. No. 4,530,873, JP 8302506 and GB 2 138 745, in particular multilayered fabrics for garments or shoes, comprising a plurality of layers, in materials that are different from one another, arranged for promoting the flow of sweat and humidity from the skin to the external layers of the fabric. In this manner, the most internal layer of the fabric, i.e. the surface in direct contact with the skin, is kept dry. The fabrics disclosed in these documents comprise in particular at least one permeable layer and/or one porous layer, that respectively enable the liquid to flow through and absorb and collect the humidity and/or the sweat that are then conveyed outside, where, for example, they are expelled by evaporation.

European patent publication EP 0 639 361 shows a composite material for making elements for an orthopaedic support in which a user is in contact with a fabric of hydrophobic fibres joined to an intermediate perforated layer of foam rubber that is in turn joined to an external section consisting of a more internal hydrophilic layer and of a more external hydrophobic layer. The humidity emitted by the skin of the user passes through the fabric made of hydrophobic fibres and the holes of the intermediate layer and is then distributed by the first hydrophilic layer, increasing evaporation from the second hydrophobic layer.

It is further known to make products that are intended to come into contact with the skin of a user, by laminar structures comprising at least one layer provided with holes or made of porous material (for example foam or felt).

European patent application EP 0 792 594 discloses for example a shoe with permeability to vapour in which a felt arranged for evacuating the sweat/humidity produced by the foot is inserted into a space obtained between the external sole and the plantar zone.

United States patent publication US 2005/0142334 shows an orthopaedic apparatus having a laminar structure with a coating that encloses a material provided with large number of channels starting from open cells, by means of which channels the sweat can migrate from the skin outwards.

Japanese patent application JP 9135716 discloses a fabric comprising a layer of fabric made of non-circular fibres and impregnated with antimicrobial agents, and a layer of foam material, for example of synthetic resin. Patent documents CN 201169219, EP 1 192 886, EP 1 454 560, GB 2 248 774, JP 2006122417, WO 94/01609 and CN 201224208 disclose a fabric that is similar to that of JP 9135716 and is used to make portions of seats for cars, perambulators for children, cushions and mattresses.

From U.S. Pat. No. 5,488,746 a mattress cover is also known in which two external layers joined by a zip closure enclose an internal foam core to be able to wash separately the core and the cover. Another mattress cover provided with a zip closure is shown from Chinese patent CN 201238857.

SUMMARY OF THE INVENTION

One object of the invention is to provide a system for receiving a user with the possibility of maintaining the skin of the user dry by removing the sweat and humidity.

One advantage is to make a constructionally simple and cheap system.

Another advantage is to make a system the use of which is significantly simple and practical.

Still another advantage is to provide a system that is able to eliminate effectively the sweat and humidity from the skin of a user, ensuring a significant degree of comfort to the user. This advantage can be obtained with particular efficacy by virtue of an effect of alternating pumping air inwards the system and pumping humidity outwards the system.

A further advantage is to make a versatile system available that can be easily used in combination with various products that are already known, such as, for example, mattresses, armchairs or sofas for furnishings or for motor vehicles, cushions, padded seats or backs, rucksacks, sporting equipment, pushchairs for children, seats for children (for example seats for cars or high chairs), seats for motor cycles, shoes. The system can be advantageously applied to these products by simple resting, or by removable connecting means of known type (laces, Velcro, buttons, etc), or can be integrated with the products.

Such objects and advantages and still others are all achieved by a system according to any one of the claims set out below.

SHORT DESCRIPTIONS OF THE DRAWINGS

The invention can be better understood and implemented with reference to the attached drawings that illustrate some non-limiting embodiments.

FIG. 2 is a partially sectioned schematic side view of a seat for motor vehicles into which the system in object is integrated.

FIG. 3 is a schematic perspective view of the seat in FIG. 2.

DETAILED DESCRIPTION

Figure 1:
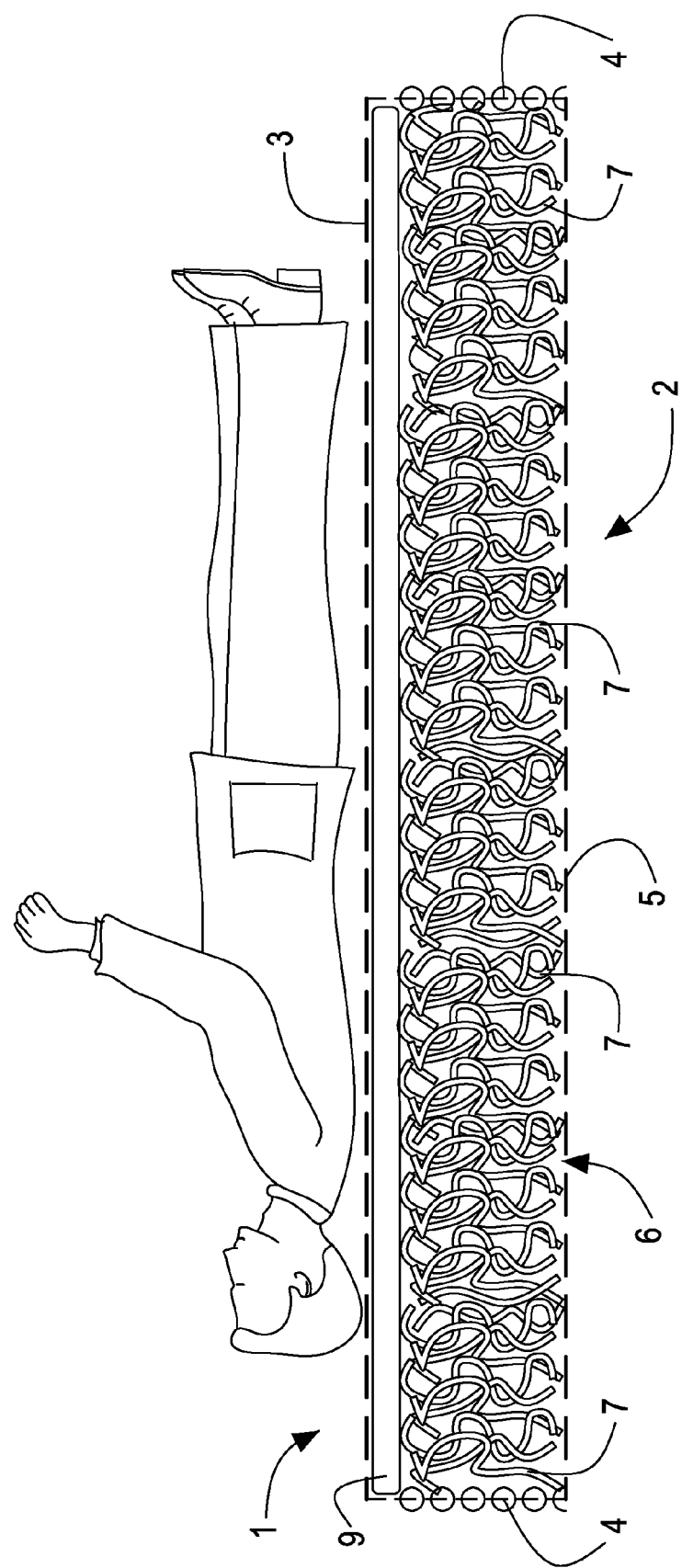
FIG. 1 is a schematic section view of a first embodiment of the system in object.

With reference to FIG. 1, with 1 an embodiment of the system in object has been indicated on the whole.

In the specific case of FIG. 1 the system is in the shape of a cushion or mattress cover that can be placed, for example rested, in a free or bound manner, with known attaching means, on the upper side of a mattress (known and not illustrated).

Figure 1B:
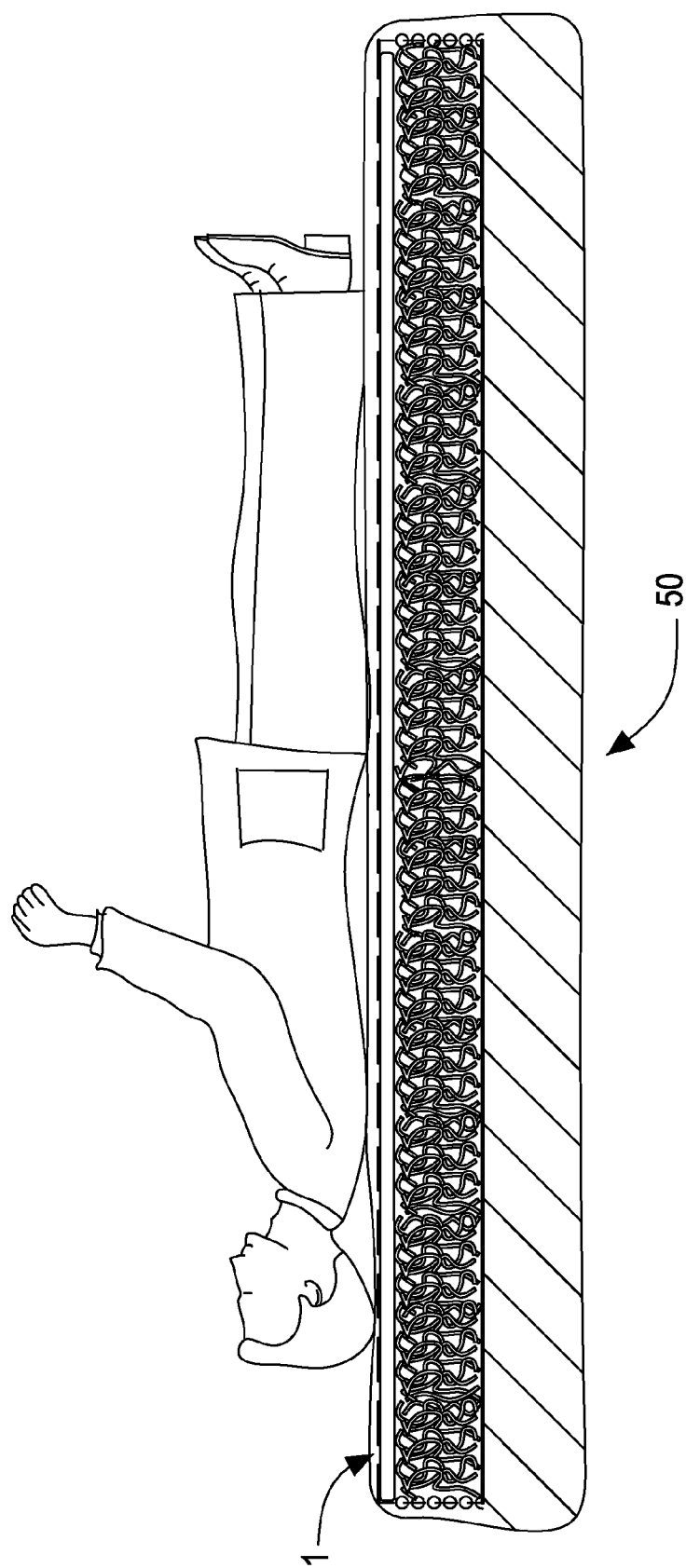
FIG. 1b is a schematic section view of a mattress into which the system of FIG. 1 is integrated.

FIG. 1b shows a mattress 50 into which the system of FIG. 1 is integrated, a system that will be disclosed in detail below. It should be noted that the system is located inside the mattress 50, in particular at the zone where a user can lie down.

The system 1 comprises an external covering or casing 2. The casing 2 has a first portion 3 intended for the contact with an individual. The first portion 3 is made of a material (of known type) comprising hydrophilic fibres and hydrophobic fibres configured for conveying liquids or wet vapour from outside to inside the casing. In particular, the first portion 3 is structured in such a manner as to convey sweat and humidity from outside to inside the casing 2.

The first portion 3 can be made of a fabric, of known use, for example, in the clothing sector, that is able to exert an effect called "push-pull". This type of fabric is already used, as said, in garments that, in contact with the skin of a user, have the ability to absorb the sweat and/or the humidity and to convey the sweat and/or the humidity outwards, where they can be eliminated, for example through evaporation. In the case in object, the "push-pull" fabric that may form the first portion 3 of the casing 2 is configured in such a manner as to absorb the sweat and/or the humidity and to transfer the sweat and/or the humidity to the inner side of the casing 2, i.e. inside the system 1.

In the present patent application, the expression "push-pull" means any fabric or material that is able to exert the so-called "push-pull" effect, which is well-known to those skilled in the art, and not just a "push-pull" fabric like those of known type.

The casing 2 has at least a second portion 5 opposite the first portion and at least a third peripheral portion 4 that joins the first portion 3 to the second portion 5. The second portion 5 and/or the third portion 4 are made of a material that is permeable to air and humidity, such as, for example, GORE-TEX® or anyway a porous material that enables wet vapour to exit outwards and air to enter inwards. The casing 2, in particular the portions 4, 5 thereof, can be made of a breathable perforated fabric provided with a plurality of holes or microholes (which are not shown).

The casing 2 encloses an internal padding 6 that is wound by the casing 2. The padding 6 is interposed between the first portion 3 and the second portion 5. The casing 2 can be detached from the padding 6, so that the casing 2 can be washed separately from the padding 6. In particular, the casing 2 can be provided with a rapid closing and opening device, of known type and not illustrated, that enables the padding 6 to be inserted into and extracted from the casing 2. The rapid closing and opening device of the casing may comprise, for example, a normal zip-fastener or other device to removably connect a pair of longitudinal flaps of the casing 2 that extend, optionally, at least in part, along the third casing portion 4. It is anyway possible to provide for the system 1 having the casing 2 integrated to the padding 6. The casing 2 may further comprise a permeable layer 9 of polyurethane foam interposed between the first portion 3 and the padding 6. This layer can be further provided with a plurality of holes (not shown in FIGS. 1 and 1b) that are substantially vertical so as to increase the absorption of sweat and/or humidity from the first portion 3 to the padding 6, and thus the comfort of the user.

The internal padding 6 has a porous structure to permit ventilation inside the casing 2. The padding has a compressible variable-volume structure with spring-back. In the embodiment in FIG. 1, which is illustrated by way of example, the third casing portion 4 is made in such a manner as to enable air to enter and humidity to exit through the effect of the variation of the volume of the structure of the padding ("in-out" pumping effect). In other words, the casing (and in particular the portions 3, 4, 5 thereof) defines a pumping chamber or cavity with a variable volume in which the padding 6 is received.

The padding 6 may comprise, for example, an arrangement of elements 7 with an elongated shape, which are visible in FIG. 1. These elements 7 can be intertwisted together, for example in a disorderly manner. The padding 6 can be made of plastics (such as, for example, polyethylene), or of another material. The plastics of the padding can have a resistance to crushing that is greater than about 1 kg/m2.

The third portion 4 can have an annular edge connected to the first portion 3. The third portion 4 can also have a further annular edge connected to the second portion 5. The connections between the various casing portions may be of irremovable type, like, for example, normal seams.

In use, the first portion, which is frontal i.e. in contact with the user, absorbs sweat and conveys the sweat to the inner side of the casing, exploiting the "push-pull" effect due to the combination of hydrophilic and hydrophobic fibres. The material of the padding 6, having a structure that is porous or anyway permeable to air, enables ventilation inside the casing. The third casing portion 4, which is arranged on the peripheral zone of the system 1 and is not normally in contact with the user, enables the exit from inside outwards the casing of the sweat and/or humidity previously absorbed and transferred from the outside inwards through the first portion 3.

The exit of sweat and/or humidity can be promoted by a pumping effect ("in-out pumping effect") due to crushing of the padding by the user, who naturally moves on the mattress onto which the system 1 has been placed.

The movements of the user entail an alternating effect of both pumping of wetter air from inside the casing outwards the casing (through the portions 4 and 5) and sucking of dryer air from outside the casing inwards the casing. This permits an air exchange and better ventilation and removal of sweat and/or humidity from the system, with an increase in the sensation of comfort of the user.

In other embodiments of the system according to the invention, which are not shown, the pumping effect ("in-out pumping effect"), i.e. the variation in volume of the padding 6, can be obtained, for example, by mechanical devices driven by means of any pneumatic, or electric or hydraulic driving means that enables the padding 6 to be compressed and expanded alternately in order to obtain the desired effect disclosed above.

The third casing portion 4 can further act as a barrier to liquids, in particular water, both outwards and inwards the casing. Alternatively, the third portion 4 can also be permeable to liquids.

Also the second portion 5 can contribute to the entry of air inside the casing 2. Further, this second portion 5, which can be made of a material that is impermeable to liquids and, optionally, also to vapour, can prevent the exit of humidity, in particular retaining liquids to preventing wetting on the outside.

In FIGS. 2 and 3 there is illustrated a seat 10 for a motor vehicle into which a system 11 according to the invention is integrated.

The seat 10 comprises a seat 14' and a back 15', both comprising the system 11. In one embodiment that is not shown the system 11 can be integrated only into the seat or only into the back.

Figure 4:
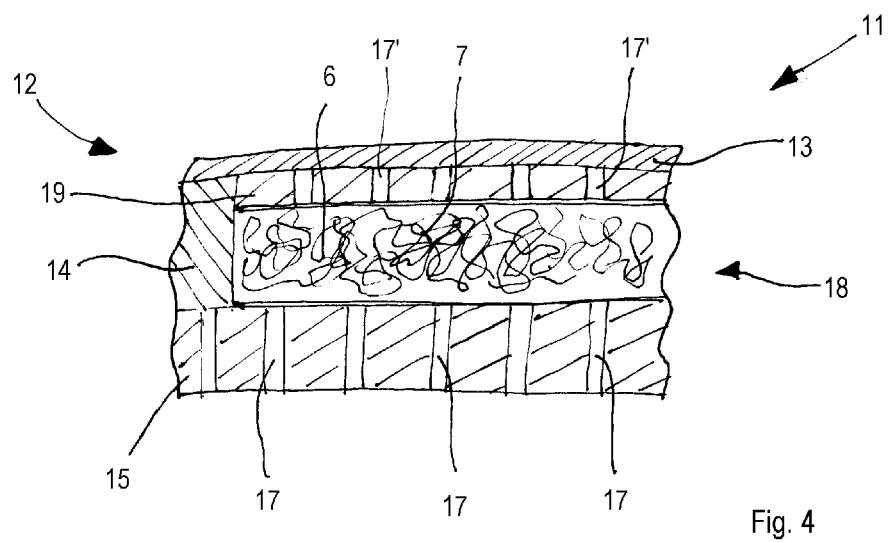
FIG. 4 is a schematic perspective view of the back of the seat according to the line IV-IV in FIG. 2.

FIG. 4 illustrates a partial section of the seat into which the system 11 has been inserted, having a casing 12 comprising a first external portion 13 intended for contact with an individual, a second portion 15 opposite the first portion 13 and a third peripheral portion 14 that joins the first portion 13 to the second portion 15. The first portion 13 includes, for example, a "push-pull" fabric provided with hydrophilic fibres and hydrophobic fibres, such as to convey sweat and/or humidity from outside inwards the casing 12.

The second portion 15 and the third portion 14 comprise respective portions of a filling body 18 of the seat made typically of polyurethane foam, and obtained by injection moulding. The casing 12 substantially forms a chamber or cavity containing the padding 6 that comprises, similarly to the embodiment of the system 1 in FIG. 1, an arrangement of elements 7 of elongated shape that can be intertwisted together, for example in a disorderly manner. The padding 6 can be made of plastics (such as, for example, polyethylene), or of another material.

The casing 12 further comprises a fourth portion 19 interposed between the first portion 13 and the padding 6, which is also made of polyurethane foam like the second portion 15 and the third portion 14. The fourth portion 19, which is optional, ensures the user greater comfort if the first portion 13 is too thin or stiff. It should be noted that the fourth portion 19 can be fixed to the first portion 13, as occurs in seats of known type.

The third portion 14 comprises a plurality of holes 17 that connect the inside of the casing 12, i.e. the chamber in which the padding 6 is housed, with the outside of the seat 10 such as to enable both the air to enter into said chamber to obtain the desired ventilation and the sweat and/or humidity that have been previously absorbed and transferred from outside to inside through the first portion 13 to exit from inside outwards the casing 12 through the second portion 15. The holes 17 can be advantageously made in suitable positions of the filling body 18 of the seat 14', so as to face zones of the supporting frame of the seat that are devoid of metallic material. In other words, the holes 17 face respective holes obtained in the metallic supporting frame of the seat.

The fourth portion 19 comprises a further plurality of through holes 17', that are suitable for further promoting the absorption of sweat and/or humidity from the first portion 13 to the padding 6 and in general to improve ventilation of the seat through the passage of air from the padding 6 to the first portion 13.

In an embodiment that is not shown, the fourth portion 19 is devoid of the further plurality of holes, absorption of sweat and/or humidity being obtained owing to the properties of the material with which the fourth portion 19 is made, i.e. the polyurethane foam.

It should be noted that in this embodiment the casing 12 of the system 11 is made by using already existing portions of the seat, in particular an external cover thereof that acts as a first portion 13, and a filling body 18 thereof that forms the second portion 15, the third portion 14 and the fourth portion 19.

In use, the system 11 operates substantially in the same manner as disclosed previously with reference to FIG. 1. In particular, the first portion 13 of the casing 12, which is frontal i.e. in contact with the user, absorbs the sweat and/or the humidity and conveys the sweat and/or the humidity—through the further plurality of holes 17'—inside the padding 6, the material of which (for example polyethylene) enables the inside of the seat 10 to be ventilated. In particular, the sweat and/or the humidity are then conveyed outside the seat 10 through the plurality of holes 17 provided on the second portion 15 of the casing 12. The exit of sweat and/or humidity can be promoted by a pumping effect ("in-out pumping effect") owing to the crushing of the padding 6 by the user, who moves, naturally, on the seat 10. The movements of the user entail an alternating effect of both pumping of wetter air from inside the casing 12 outwards the casing 12 and sucking of drier air from outside the casing inwards the casing, these pumping and sucking actions both occurring preferably through the holes 17 made in the second portion 15. This enables an exchange of air and better ventilation and removal of sweat and/or humidity from the system 11, with an increase in the sensation of comfort of the user seated on the seat 10. As will be clear to those skilled in the art, integrating the system 11 into the seat is simple and does not entail additional manufacturing costs. In fact, it is sufficient to modify suitably the mould for forming the filling body 18 of the seat 10, so as to obtain in the filling body 18 a housing or chamber that is able to receive the padding 6.

Figure 5:
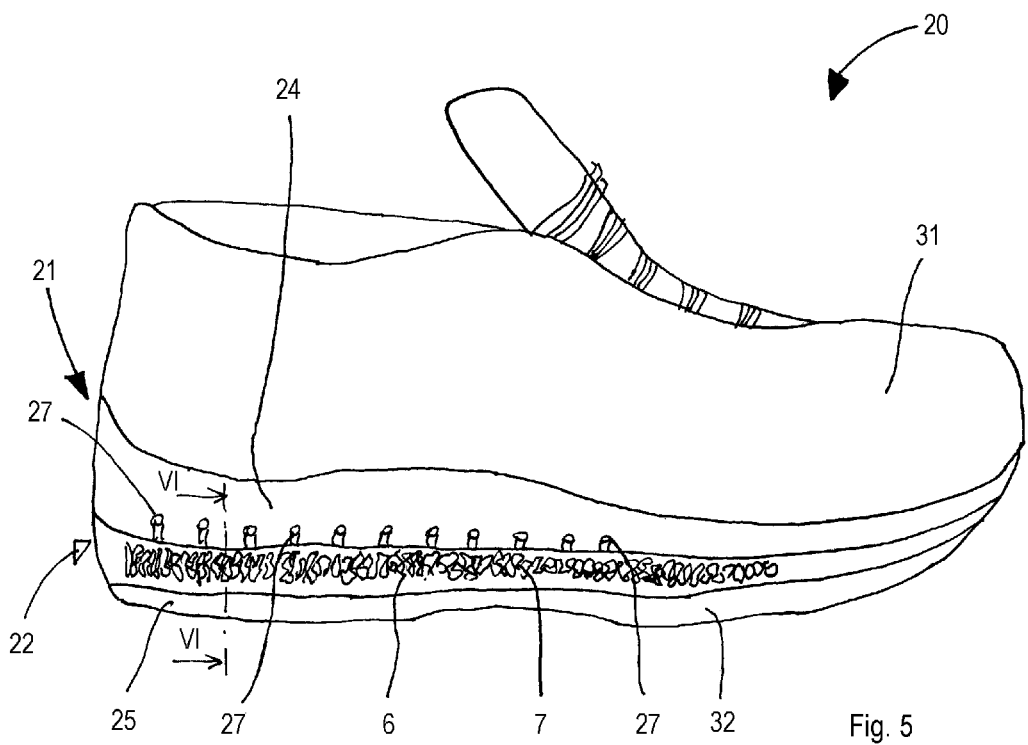
FIG. 5 is a schematic side view of a shoe into which the system in object is integrated.
Figure 6:
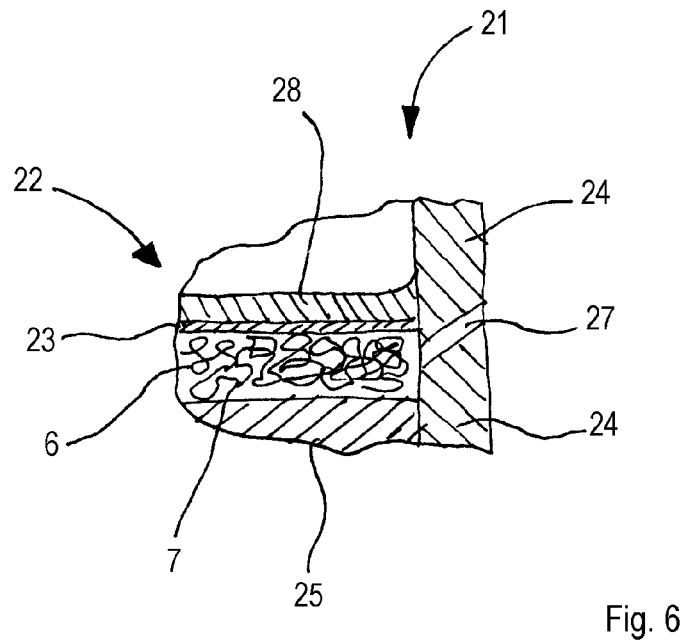
FIG. 6 is a partial, schematic and enlarged section view, according to plane VI-VI in FIG. 5.

In FIG. 5 there is illustrated a shoe 20 of known type into which a system 21 according to the invention is integrated. FIG. 6 illustrates a partial section of the shoe into which the system 21 has been inserted, comprising a casing 22 that includes a first portion 23 intended for contact with the foot of a user, a second portion 25 opposite the first portion 23 and a third portion 24 arranged laterally, not intended for contact with the ground, to join along the perimeter the first portion 23 with the second portion 25 such as to define, in cooperation with the first portion 23 and the second portion 25, a chamber for housing the padding 6. The first portion 23 includes, for example, an insole made of "push-pull" breathable material or fabric, i.e. which is provided with hydrophilic fibres and hydrophobic fibres, such as to convey sweat and/or humidity from inside the shoe 20 to inside the casing 22, in particular in the padding 6.

The second portion 25 forms at least one part of the sole 32 of the shoe 20 intended for contact with the ground, and the third portion 24 bounds inferiorly the upper 31 of the shoe 20. The padding 6 comprises, similarly to the embodiments of the system disclosed above and illustrated in FIGS. 1, 1b and 2-4, an arrangement of elements 7 of elongated shape that can be intertwisted together, for example in disorderly manner, made of plastics (such as, for example, polyethylene), or of another material.

The shoe 20 can be provided with a further portion 28 of padding made of a foam material superimposed on the first portion 23 and forming at least a part of a further insole 28 intended in use for contact with the sole of a user. The insole 23 and the further insole 28 are perforated to allow better breathability and thus the passage of sweat and/or humidity from inside the shoe 20 to inside the casing 22.

On the third portion 24 of the casing 22 a plurality of holes 27 are made that place the aforesaid chamber in communication with the external environment. The holes 27 are, for example, cylindrical, and can be arranged according to an appropriate inclination.

In use, the system 21 operates substantially in the same manner disclosed previously with reference to FIG. 1. As is visible in FIGS. 5 and 6, the first layer 23 or insole (for example made of perforated fabric) and the further insole 28 (which, for example, is also made of perforated fabric) on both of which the sole of the user rests absorb the sweat and/or the humidity, and convey the sweat and/or the humidity inside the padding 6, the material of which enables the inside of the shoe to be ventilated. Sweat and/or humidity are then conveyed outside the shoe through the holes 27. The exit of sweat and/or humidity can be promoted by a pumping effect ("in-out pumping effect") due to the crushing of the padding 6 by the foot during the natural movement thereof whilst the user is walking. The movements of the user entail an alternating effect of both pumping of wetter air from inside the shoe outwards the shoe and sucking of drier air from outside the shoe inwards the shoe, pumping and sucking both occurring through the holes 27. This enables an exchange of air and better ventilation and removal of wet sweat vapour from the system, with an increase in the sensation of comfort of the user. It should further be noted that the padding 6, owing to the structure thereof, further acts as a shock absorber, so as to be make the shoe less stiff and thus even more comfortable for the user.

Figure 7:
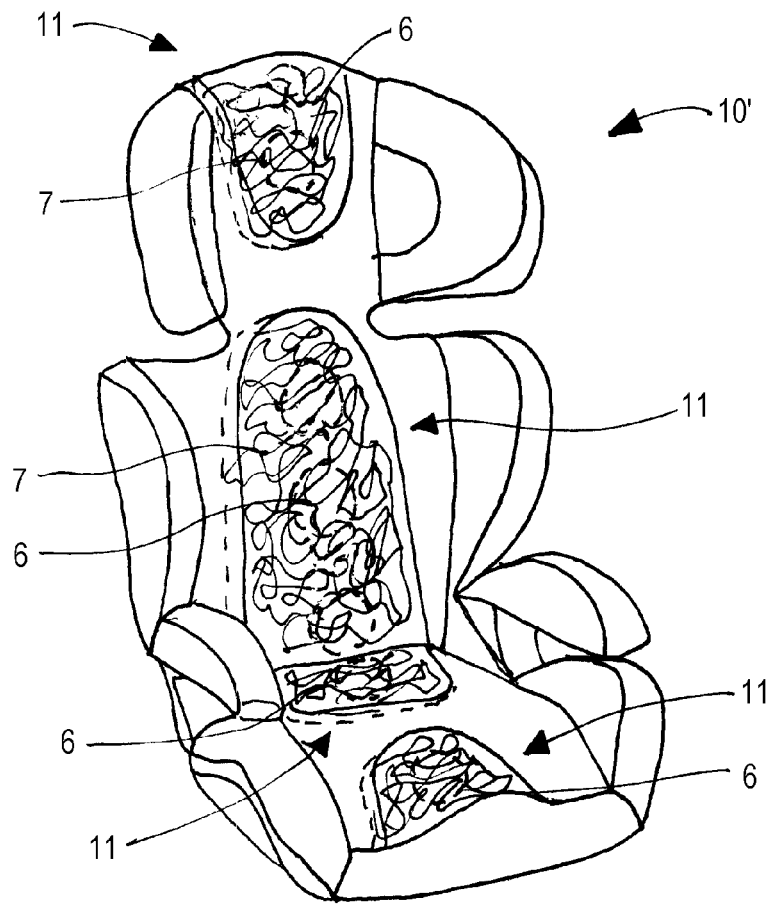
FIG. 7 is a schematic perspective view of a seat for children for motor vehicles in which the system in object is integrated.

In FIG. 7 there is illustrated a seat 10' for conveying children in a vehicle that is made with similar elements to those of the seat 10 in FIGS. 2-4 and is therefore substantially the same as the latter. Into seat 10' a system 11 is integrated (disclosed above and shown in detail in FIG. 4), arranged at various zones of the seat 10', in particular where the child rests the head, the back and the lower limbs. It is intended that such zones are shown by way of non-limiting example. In these zones, owing to the presence of the padding 6 made of plastics comprising the arrangement of elongated elements 7, the sweat and/or the humidity generated by the skin can be disposed of and eliminated to the inside of the seat, such as to make it more comfortable and dryer. It should be noted that, unlike the system 11 disclosed above, the seat 10' comprises a second portion 15 on which the plurality of holes 17 is made that is not made of polyurethane foam but is a stiff structural portion of the seat itself, generally made of plastic material and having holes in suitable positions.

Figure 8:
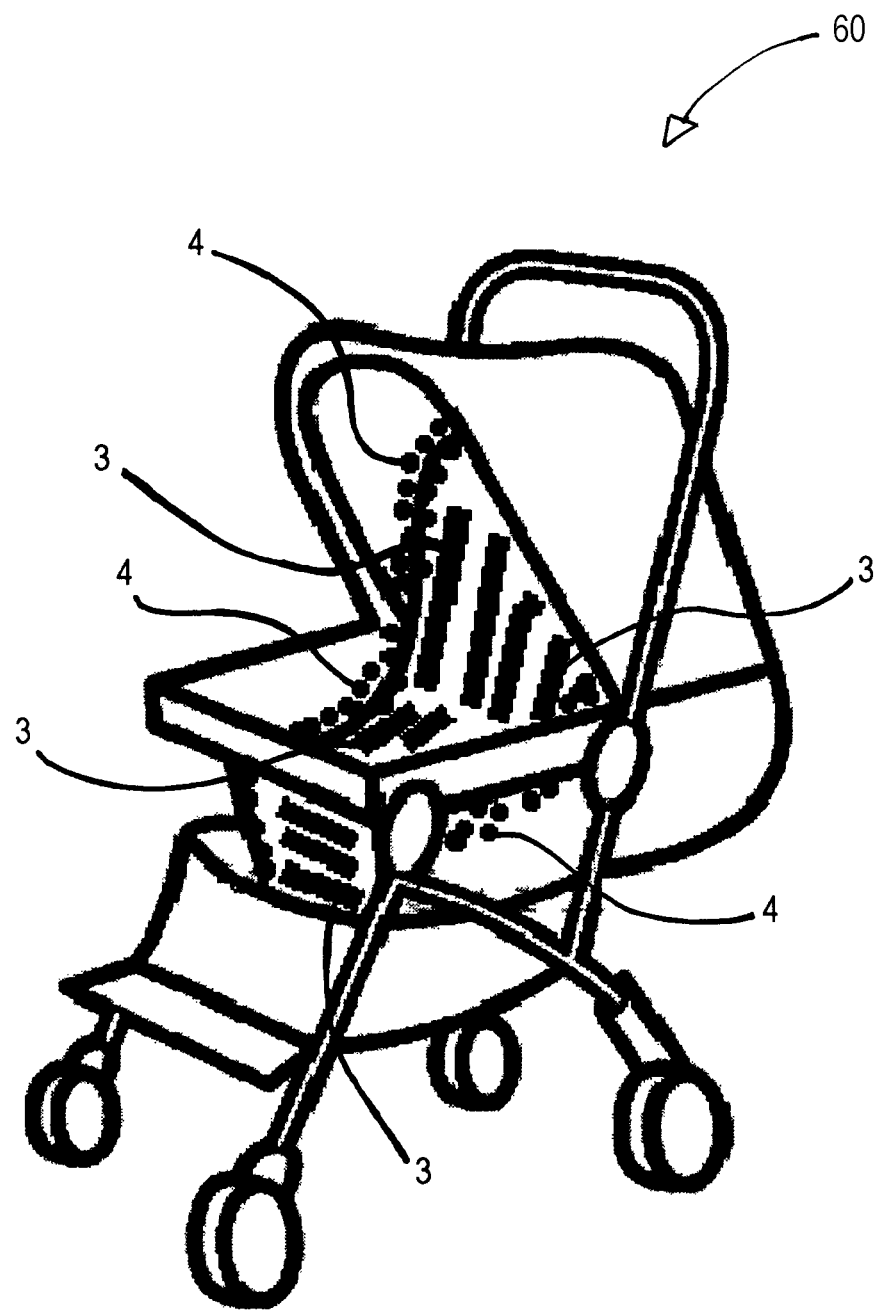
FIG. 8 is a perspective view of a pushchair for children in the seat of which the system in object is integrated.

In FIG. 8 there is illustrated a pushchair 60 for children that is made with similar elements to those of the system 1 in FIG. 1 and are therefore indicated by the same numbering: in particular the first portion 3 and the third portion 4 are visible. The seat of the illustrated pushchair can also be made like the seat 10 disclosed above and shown in FIGS. 2-4.

The system in object can be effectively placed on mattresses or can be integrated into seats for motor vehicles or into shoes, as disclosed above. Further, the system can also be placed upon, or integrated into, armchairs or sofas for furnishings, padded seats or backs for various applications of known type, cushions, rucksacks, sports equipment, pushchairs for children, seats for children (for example seats for cars or high chairs), seats for motor cycles, etc. In all the applications of the system in object it is possible for the casing to be of the integrated type with the padding or to be of the removable type.

The invention claimed is:

1. A shoe (20) comprising an upper and a sole, the sole comprising a casing (22) provided with:
at least one first portion (23) made of a material comprising hydrophilic and hydrophobic fibers configured to convey a liquid and/or wet vapor from outside to inside said casing (22), said at least first portion (23) configured to be in contact with, or near, a part of a user's body, at least one second portion (25), not for contact with the part of the body, at least one third portion (24) that joins said at least one first portion (23) with said at least one second portion (25), said at least one second portion (25) and/or said at least one third portion (24) being made of material configured to convey a liquid and/or wet vapor from inside to outside said casing (22);

at least one padding (6) enclosed between said at least one first and second portions, having a porous structure to enable an inside portion of the structure to be ventilated as a result of sweat and/or wet vapor exiting from said casing by way of a contraction in a volume of said padding and causing air to enter from outside to inside said casing by way of an expansion in the volume of said padding, said porous structure having a variable volume that is compressible with spring-back, wherein:

said at least one first portion (23) forms at least one part of an insole configured for contact with, or near, a sole of a user, said at least one second portion (25) forms at least one part of the sole (32) of said shoe (20) configured for contact with the ground, and said at least one third portion (24) is arranged laterally, not configured for contact with the ground, to join along a perimeter of said at least one first portion (23) with said at least one second portion (25) thereby defining, in cooperation with said at least one first portion (23) and with said at least one second portion (25), a chamber for housing said padding (6);

said at least one third portion (24) being provided with a plurality of holes (27) that connect the inside of said casing (22) with the outside so as to enable both the air to enter said casing (22) for ventilation, and the sweat and/or humidity previously transferred to exit outside said casing (22) through said at least one third portion (24).

2. The shoe according to claim 1, wherein said casing (22) further comprises a further padding portion (28) made of spongy material superimposed on said at least one first portion (23) and forming at least one part of a further insole (28) configured for contact with the sole of a user.

* * * * *